United States Patent
Kuwata

(10) Patent No.: US 6,349,358 B1
(45) Date of Patent: Feb. 19, 2002

(54) MAGNETIC DISC CONTROL APPARATUS CAPABLE OF DETECTING A NEAR SEQUENTIAL I/O AND STORING IT TO A CACHE MEMORY, AND A SYSTEM THEREOF

(75) Inventor: Atsushi Kuwata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/375,390

(22) Filed: Aug. 17, 1999

(30) Foreign Application Priority Data

Aug. 31, 1998 (JP) ............................................. 10-245691

(51) Int. Cl.7 ............................................. G06F 12/00
(52) U.S. Cl. ...................... 711/113; 711/137; 711/204; 711/213; 711/217; 711/205
(58) Field of Search .......................... 711/4, 112, 113, 711/133, 137, 159, 204, 206, 208, 209, 218, 111, 205, 213, 217

(56) References Cited

U.S. PATENT DOCUMENTS

| | | | | |
|---|---|---|---|---|
| 5,761,706 A | * | 6/1998 | Kessler et al. ............... | 711/118 |
| 5,941,981 A | * | 8/1999 | Tran ............................ | 712/207 |
| 6,070,230 A | * | 5/2000 | Capps ......................... | 711/137 |
| 6,076,151 A | * | 6/2000 | Meier .......................... | 711/171 |
| 6,092,145 A | * | 7/2000 | Kigami et al. ................. | 711/4 |
| 6,092,149 A | * | 7/2000 | Hicken et al. .............. | 711/113 |
| 6,098,153 A | * | 8/2000 | Fuld et al. ................... | 711/134 |
| 6,157,993 A | * | 12/2000 | Lewchuk .................... | 711/213 |

* cited by examiner

*Primary Examiner*—Hong Kim
(74) *Attorney, Agent, or Firm*—Foley & Lardner

(57) ABSTRACT

A magnetic disc control apparatus detects a near sequential I/O and pre-reads data from a magnetic disc drive into a cache memory. The control apparatus includes a near sequential I/O processor, which has an I/O history storage table for storing a transfer end address of I/O requested by a host computer, a near sequential I/O identifier for calculating an address difference between the transfer end address read out from this I/O history storage table and the current I/O transfer start address and identifying the I/O as a near sequential I/O if the address difference is within a predetermined value, and a pre-read executor for pre-reading data from the magnetic disc drive to the cache memory when a near sequential I/O is detected.

10 Claims, 3 Drawing Sheets

FIG. 2

(I/O HISTORY STORAGE TABLE) 235

| SEGMENT NUMBER | TRANSFER END ADDRESS | HIT COUNT |
|---|---|---|
| SEGMENT NUMBER | TRANSFER END ADDRESS | HIT COUNT |
| ... | ... | ... |
| SEGMENT NUMBER | TRANSFER END ADDRESS | HIT COUNT |
| SEGMENT NUMBER | TRANSFER END ADDRESS | HIT COUNT |
| SEGMENT NUMBER | TRANSFER END ADDRESS | HIT COUNT |

MAGNETIC DISC CONTROL APPARATUS CAPABLE OF DETECTING A NEAR SEQUENTIAL I/O AND STORING IT TO A CACHE MEMORY, AND A SYSTEM THEREOF

BACKGROUND OF THE INVENTION

1. Field of the Invention

The present invention relates to a magnetic disc control apparatus and in particular, to a magnetic disc control apparatus having an improved throughput as follows. If an I/O request from a host computer is identified as a sequential I/O, data items in the area to be read by the sequential I/O later is pre-read out and stored in a cache memory, so that the data items in this cache memory are read out with a higher priority than the magnetic disc drive.

2. Description of the Related Art

An I/O pattern successively accessing a continuous recording space of a magnetic disc is called "sequential I/O". The I/O stands for input/output. In the present invention I/O means read access.

In a conventional magnetic disc control apparatus, a plurality of I/O transactions requested from a host computer is identified as a sequential I/O or not. When the I/O is determined to be a sequential I/O, and data items after in a specified area and after are read into a cache memory. After this, when an I/O request is made by the host computer, the cache memory is read with a higher priority, so as to reduce the access frequency of the magnetic disc. This improves the throughput in comparison to a case when the magnetic disc is accessed each time. Here, the sequential I/O is identified as follows. An end address of the preceding I/O is stored and when an I/O having a start address identical to the end address is received, the I/O is determined to be a sequential I/O.

On the other hand, an access pattern of a sequential I/O not completely sequential but has some missing addresses is called "near sequential I/O". A system configuration may be such that when the host computer requires a continuous large data item, a technique of index or the like is used eliminating necessity of accessing to all the data items. In this case, a near sequential I/O is generated. In the conventional disc control apparatus, a processing identical to the random I/O has been performed. That is, each time, the magnetic disc drive is accessed. Here, if the near sequential I/O is pre-read like a sequential I/O and data items are stored in the cache memory beforehand, it is considered that throughput can be improved in the same way as the sequential I/O. However, there has been no method for effectively detecting the near sequential I/O.

SUMMARY OF THE INVENTION

It is therefore an object of the present invention to provide a magnetic disc control apparatus capable of detecting a near sequential I/O and pre-reading near sequential I/O into a cache memory in the same way as a sequential I/O.

The inventor of this invention has reached the idea of the near sequential I/O detection using the principle shown in FIG. 3.

In FIG. 3, the horizontal axis represents a continuous address space on the magnetic disc, which address space is divided at an identical interval, so as to define identical segments 0 to segment 4. Each of the arrows 11, 12, 13, 14 represents an I/O from the host computer. The ends of each of the arrows represent a transfer start address and a transfer end address. The length of each arrow represents a single I/O transfer length.

Firstly, there is assumed an I/O shown as the arrow 11. Here, the I/O transfer end address belongs to segment number 1, which is used as a key to store the I/O transfer end address of the arrow 11 in the memory table. Next, when the I/O shown by the arrow 12 is requested, the table retrieval is performed using the segment to which the I/O start address belongs. Thus, it is detected that the I/O shown 11 has been present. Here, the transfer end address of the arrow 11 is continuous to the transfer start address of the arrow 12, and accordingly the I/O is determined to be sequential and pre-read is performed as in the conventional method according to the number of occurrences of the sequential I/O.

Explanation will be given on identification of a near sequential I/O. If the I/O shown by the arrow 11 is followed by the I/O shown by the arrow 13, the arrow 11 transfer end address does not match with the arrow 13 transfer start address. However, if the address difference L1 is within a predetermined range, the I/O is identified as a near sequential I/O and pre-read is performed in the same way as the sequential I/O. For example, it is possible to identify a near sequential I/O when the address difference L1 is smaller than the I/O transfer length (length of the arrow 13). In this case, as the I/O shown by arrow 14 is determined to be a random I/O because the address difference L2 is greater than the predetermined range and no pre-read is performed.

A magnetic disc control apparatus according to the present invention is for use in controlling a magnetic disc apparatus including: a magnetic disc drive; and a cache memory from which a data is read out with a higher priority than from the magnetic disc drive. The magnetic disc control apparatus comprises an I/O processor for receiving an I/O request from a host computer, reading out from the cache memory or the magnetic disc drive, a data item corresponding to the I/O request, and passing the data item to the host computer; a near sequential I/O identifying block for deciding, each time an I/O request is entered from the host computer to the I/O processor, whether a current I/O is a near sequential I/O, i.e., the current I/O is near the preceding I/O; and a pre-read executor for pre-reading a data in the magnetic disc drive after a current I/O transfer end address and stores the data in the cache memory if the current I/O is a near sequential I/O.

BRIEF DESCRIPTION OF THE DRAWINGS

FIG. 2 is shows a configuration of an I/O history recording table shown of FIG. 1.

DESCRIPTION OF THE PREFERRED EMBODIMENTS

Figure 1:
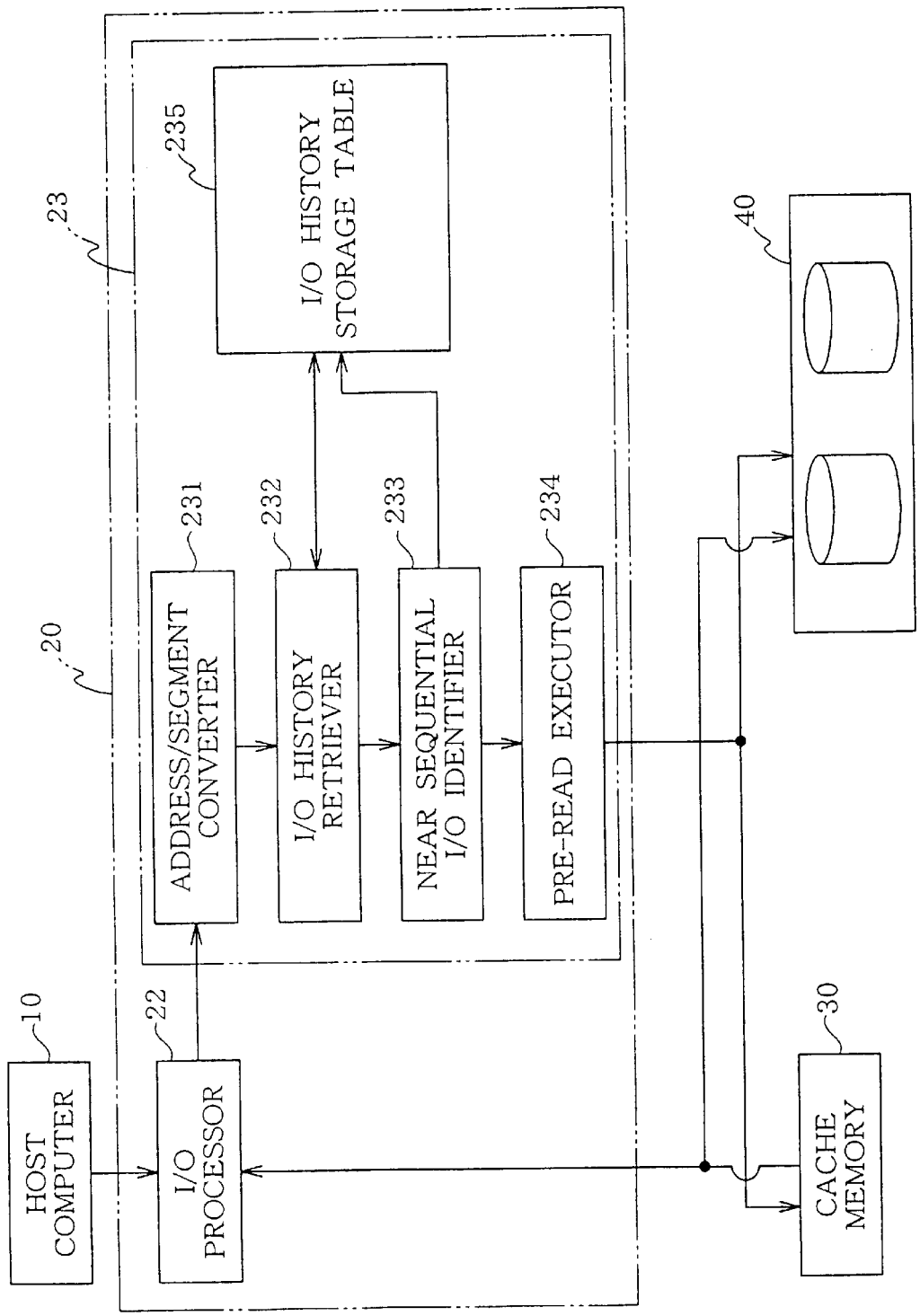
FIG. 1 is a block diagram showing a configuration of a magnetic disc control apparatus according to an embodiment of the present invention.
Figure 3:
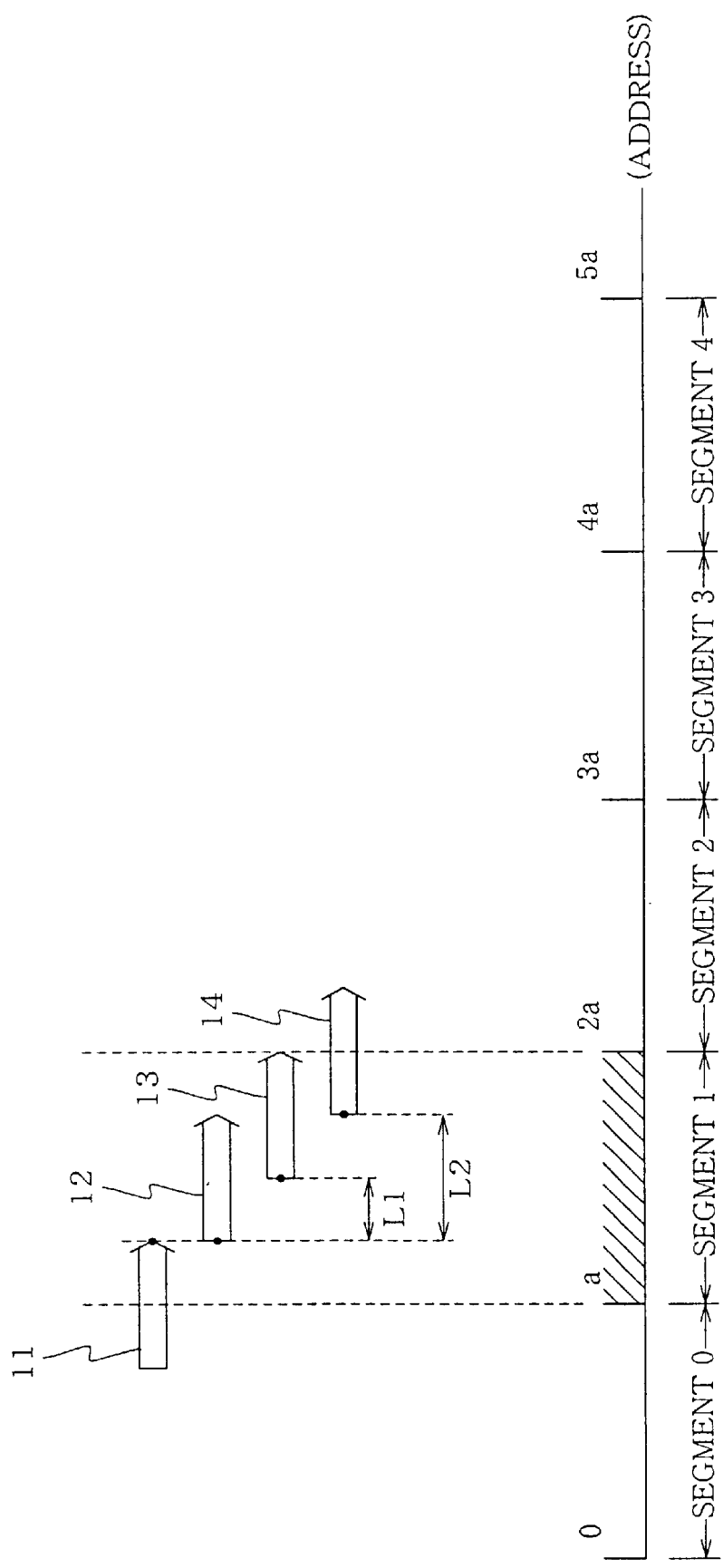
FIG. 3 explains principle of the near sequential I/O detection.

Description will now be directed an embodiment of the present invention with reference to FIG. 1 to FIG. 3.

FIG. 1 shows a magnetic disc system including a magnetic disc control apparatus 20 according to the embodiment. This magnetic disc system includes: a host computer 10, a magnetic disc control apparatus 20, a cache memory 30, and a magnetic disc drive 40.

The host computer successively supplies I/O requests to the magnetic disc control apparatus 20.

The magnetic disc control apparatus 20 has an I/O processor 22 and a near sequential I/O processor 23.

The I/O processor 22 receives an I/O request from the host computer 10 and makes an access to the cache memory 30 or the magnetic disc drive 40 to read out a requested data item, which is passed to the host computer 10. Here, the I/O processor 22 preferentially accesses to the cache memory 30 than the magnetic disc drive 40. If a necessary data item is found in the cache memory 30, the data item is read out, and no access is made to the magnetic disc drive 40. On the other hand, if the necessary data item cannot be found in the cache memory 30, an access is made to the magnetic disc drive 40 and the data item is read out and passed to the host computer 10. Moreover, the I/O processor 22 which has received from the host computer an I/O transfer start address and a transfer end address and a transfer length, supplies these data items to the near sequential I/O processor 23.

The near sequential I/O processor 23 includes: an address/segment converter 231; I/O history retriever 232; near sequential I/O identifier 233, a pre-read executor 234; and an I/O history storage table 235.

The address/segment converter 231 receives from the I/O processor 22 an I/O start address, a transfer end address, and a transfer length, and calculates a segment to which the transfer start address belongs, and a segment to which the transfer end address belongs. The segment to which the transfer start address belongs is calculated by dividing the transfer start address by a segment size. Similarly, the segment to which the transfer end address belongs is calculated by dividing the transfer end address by a segment size. The address/segment converter supplies 231 the I/O history retriever 232 with the I/O transfer start address, its segment, the transfer end address, its segment, and the transfer length.

The I/O history retriever 232 retrieves the I/O history storage table 235 using as a key the segment to which the transfer start address belongs.

As shown in FIG. 2, the I/O history storage table 235 has a finite number of sets, each of which consists of: an I/O transfer end address requested from the host computer 10; a segment number containing the aforementioned I/O transfer end address; and a number of times of hit of a sequential I/O or near sequential I/O which has occurred for the transfer end address.

The I/O history retriever 232 retrieves in the I/O history storage table 235 an entry having an identical segment to which the transfer start address belongs and extracts a transfer end address contained in that entry. Here, the retrieval may be performed by the hash method. If this retrieval results in no entry matched with the segment, the I/O retriever 232 adds to the I/O history storage table 235, a new entry consisting of the current I/O transfer end address and the segment to which the address belongs. Here, if no empty area is left for a new entry, the oldest entry among the currently loaded entries is deleted so as to add to the new I/O entry. This updating can be performed by using LRU control. On the other hand, when the I/O history storage table 235 contains an entry matched with the current segment loads in the near sequential I/O identifier 233 at least the transfer end address retrieved, the current I/O transfer start address, the segment to which the I/O transfer end address belongs, and the current I/O transfer length.

The near sequential I/O identifier 233 calculates an address difference between the transfer end address of an entry retrieved and the current I/O transfer start address.

If the address difference is 1 (i.e., the transfer end address of the retrieved entry is continuous to the current I/O transfer start address), the I/O received currently is determined to be a sequential I/O, and the hit count (stored in the I/O history storage table 235) is incremented by 1.

On the other hand, if the calculated address difference is greater than 1, this address is determined to be longer than the current I/O transfer length. If the address difference is smaller than the current transfer length, the I/O is determined to be a near sequential I/O, and the hit count of the entry retrieved is incremented by 1 in the same way as in the sequential I/O. Moreover, if the address difference is longer than the current transfer length, the I/O is determined to be a random I/O, the current I/O transfer end address and the segment to which it belongs are updated in the I/O history storage table 235. Here, if an entry having an identical segment is already loaded in the I/O history storage table 235, the transfer end address is replaced by the current I/O transfer end address and the hit count is reset to 0. On the other hand, if no entry having an identical segment has been loaded, a new entry for the current I/O is added to the I/O history recording table 235.

Moreover, each time hit count is incremented of the respective entries of the I/O history storage table 235, the near sequential I/O identifier checks whether the resultant hit count has reached a predetermined count. If the predetermined count is reached, a start instruction is output to the pre-read executor 234. Simultaneously with this, the hit count stored in the I/O history storage table 235 is reset to 0.

The pre-read executor 234 operates as follows upon reception of the start instruction from the near sequential I/O identifier 233. That is, the pre-read executor reads out from the magnetic disc drive 40 a data of the I/O transfer length multiplied by a predetermined number, starting at the next address of the current I/O transfer end address, and stores the data in the cache memory 30.

The near sequential I/O processor 23 having the aforementioned configuration starts its operation upon reception of an information such as transfer start address from the I/O processor 22. The near sequential I/O processor 23 operates the address/segment converter 231, the I/O history retriever 232, the near sequential I/O identifier 233, and the pre-read executor 234 in this order.

On the other hand, the I/O processor 22 operates concurrently with the operation of the near sequential I/O processor 23, reading a data from the cache memory 30 or the magnetic disc drive 40 and passing the data to the host computer.

The near sequential I/O processor detects not only a sequential I/O but also a near sequential I/O, and when a sum of the sequential I/O and the near sequential I/O detection counts has reached a predetermined value, executes a data pre-read which has been performed in the conventional sequential I/O. Accordingly, even in a case of a near sequential I/O, a data read out by the I/O processor 22 hits with a higher probability in the access stage to the cache memory 30, thus enabling to improve the throughput when the near sequential I/O is performed.

Here it is also possible that the pre-read is executed when the near sequential I/O detection count has reached a predetermined value. Moreover, it is possible to select an appropriate threshold value as is desired for the address difference to determine the near sequential I/O.

The present invention having the aforementioned configuration includes a means for detecting a near sequential I/O. When a near sequential is detected, a predetermined data item to be accessed by the host computer is pre-read from the magnetic disc drive into the cache memory. Accordingly, when a near sequential I/O is requested by the host computer, it is possible to increase the throughput.

By deciding whether an address difference between the past I/O transfer end address and the current transfer start address is within a predetermined range, it is possible to easily identify a near sequential I/O. By using a transfer length of the current I/O as a threshold value for the decision, it is possible to perform a further appropriate near sequential I/O.

Moreover, by performing pre-read upon detection of a sequential I/O or near sequential I/O to the same address a predetermined number of times, it is possible to perform the pre-read effectively.

Moreover, by retrieving the I/O history storage table using as a key the segment to which the current I/O transfer start address, it is possible to rapidly find a past I/O transfer end address near to the current I/O transfer start address. Thus, it is possible to rapidly perform I/O the decision of the near sequential I/O.

Moreover, the address/segment converter divides the current I/O transfer start address by a segment length to obtain a segment number. Accordingly, it is possible to prevent increase of a data amount received in the near sequential I/O processor from the I/O processor.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-245691 (Filed on Aug. $31^{st}$, 1998) including specification, claims, drawings and summary are incorporated herein by reference in its entirety.

What is claimed is:

1. A magnetic disc control system comprising:
  a magnetic disc drive;
  a cache memory from which data is read out with a higher priority than from the magnetic disc drive; and
  a magnetic disc control apparatus comprising:
    an I/O processor for receiving an I/O request from a host computer, reading out from the cache memory or the magnetic disc drive, data corresponding to the I/O request, and passing the data item to the host computer;
    a near sequential I/O identifier for deciding, each time an I/O request is entered from the host computer to the I/O processor, whether a current I/O is a near sequential I/O;
    a pre-read executor for pre-reading data in the magnetic disc drive after a current I/O transfer end address and storing the pre-read data in the cache memory if the current I/O is a near sequential I/O; and
    an I/O history storage table for storing I/O transfer end addresses of previous requests made from the host computer,
    wherein the near sequential I/O identifier calculates an address difference between the I/O transfer end address read out from the I/O history storage table and a current I/O transfer start address, and
    wherein the near sequential I/O identifier identifies the current I/O as a near sequential I/O when the address difference is greater than one but smaller than the current I/O transfer length multiplied by a predetermined number.

2. A system as claimed in claim 1, wherein the pre-read executor executes a data pre-read from the magnetic disc drive into the cache memory when the near sequential I/O detection count for the same transfer end address stored in the I/O history storage table has reached a predetermined number.

3. A system as claimed in claim 1, wherein the pre-read executed by the pre-read executor performs pre-reading of data of the current I/O transfer length multiplied by a predetermined multiplier, starting after the current I/O transfer end address.

4. A system as claimed in claim 1, wherein the disk control apparatus further includes an I/O history retriever for retrieving an I/O history from the I/O history storage table, and a near sequential I/O processor for dividing a storage region of the magnetic disc drive into segments at an identical interval in the address direction
  wherein the I/O history retriever:
    adds a segment information to which the transfer end address belongs to the I/O history storage table for each of the transfer end addresses stored in the I/O history storage table,
    retrieves and finds from the I/O history storage table the transfer end address of identical segment to which transfer start address of the current I/O belongs, and
    enters the retrieved result into the near sequential I/O identifier to determine whether the retrieved result is a near sequential I/O.

5. A system as claimed in claim 4, wherein the disk control apparatus further includes an address/segment converter for receiving a current I/O transfer start address from the I/O processor and dividing the transfer start address by the segment size, so as to find the segment to which the transfer start address belongs, and entering that information into the I/O history retriever.

6. A system as claimed in claim 1, wherein the predetermined number is one.

7. A computer program product stored in a recording medium, the computer program controlling a disc control apparatus connected to a cache memory and a magnetic disc drive and instructing the disc control apparatus to:
  receive an I/O request from a host computer, read out I/O-requested from the cache memory of the magnetic disc drive with a higher priority of the cache memory, and pass the read-out data to the host computer;
  each time an I/O request is entered into an I/O processor from the host computer, decide whether the current I/O is a near sequential I/O by calculating an address difference between an I/O transfer end address read out from an I/O history storage table and a current I/O transfer start address, and identifying the current I/O as a near sequential I/O when the address difference is greater than one but smaller than the current I/O transfer length multiplied by a predetermined number; and
  if the current I/O is a near sequential I/O, pre-read a data after the current I/O transfer end address from the magnetic disc drive and store the data into the cache memory.

8. A computer program product stored in a medium as claimed in claim 7, wherein the predetermined number is one.

9. A magnetic disc control apparatus connected to a cache memory and a magnetic disc drive, the apparatus comprising:

means for reading out from the cache memory or the magnetic disc drive data that has been I/O-requested;

means for deciding each time an I/O request is entered from a host computer to an I/O processor, whether a current I/O is a near sequential I/O by calculating an address difference between an I/O transfer end address read out from an I/O history storage table and a current I/O transfer start address, and identifying the current I/O as a near sequential I/O when the address difference is greater than one but smaller than the current I/O transfer length multiplied by a predetermined number; and means for pre-reading a data after the current I/O transfer end address from the magnetic disc drive and storing the pre-read data in the cache memory if the current I/O is determined to be a near sequential I/O.

10. An apparatus as claimed in claim 9, wherein the predetermined number is one.

* * * * *